(12) United States Patent
Gandolfi et al.

(10) Patent No.: US 7,712,517 B2
(45) Date of Patent: May 11, 2010

(54) TUBE BUNDLE APPARATUS FOR PROCESSING CORROSIVE FLUIDS

(75) Inventors: Giorgio Gandolfi, Mediglia-Milan (IT); Giuseppe Merelli, Vertova-Bergamo (IT); Andrea Scotto, Basiglio-Milan (IT); Gian Pietro Testa, Vertova-Bergamo (IT)

(73) Assignee: Snamprogetti S.p.A., San Donato Milanese (IT)

( * ) Notice: Subject to any disclaimer, the term of this patent is extended or adjusted under 35 U.S.C. 154(b) by 1224 days.

(21) Appl. No.: 10/512,074

(22) PCT Filed: May 9, 2003

(86) PCT No.: PCT/EP03/04949

§ 371 (c)(1),
(2), (4) Date: Jul. 5, 2005

(87) PCT Pub. No.: WO03/095060

PCT Pub. Date: Nov. 20, 2003

(65) Prior Publication Data

US 2006/0032620 A1 Feb. 16, 2006

(30) Foreign Application Priority Data

May 13, 2002 (IT) .......................... MI2002A1009

(51) Int. Cl.
*B01D 19/02* (2006.01)
*F28F 19/06* (2006.01)
(52) U.S. Cl. .................... 165/11.1; 165/70; 165/133; 165/134.1
(58) Field of Classification Search ................ 165/70, 165/133, 134.1
See application file for complete search history.

(56) References Cited

U.S. PATENT DOCUMENTS

| 2,743,089 | A | * | 4/1956 | Gardner et al. | ............ 165/109.1 |
| 2,772,860 | A | * | 12/1956 | Nelson | ........................ 165/156 |
| 3,001,766 | A | * | 9/1961 | Laist | ........................ 165/134.1 |
| 4,071,083 | A | * | 1/1978 | Droin | ........................... 165/173 |
| 4,182,408 | A | * | 1/1980 | Laber | ............................. 165/70 |
| 4,333,597 | A | * | 6/1982 | Hardwick | ..................... 228/108 |

(Continued)

FOREIGN PATENT DOCUMENTS

DE 44 06 852 9/1994

(Continued)

*Primary Examiner*—Allen J Flanigan
(74) *Attorney, Agent, or Firm*—Oblon, Spivak, McClelland, Maier & Neustadt, L.L.P.

(57) ABSTRACT

A tube bundle apparatus for thermal exchange operations at high pressures and temperatures, under conditions of high aggressiveness of process fluids. The tube bundle includes a series of tubes whose internal wall includes a material selected from titanium, zirconium, or an alloy thereof, resistant to aggression of fluids, in which at least one of access chambers to the tube bundle is delimited by a wall including at least the following three metallic layers in succession: a) an external layer for tolerating pressure load, subject to corrosion by contact with the highly aggressive process fluid; b) an intermediate layer of stainless steel; (c) an anticorrosive lining in contact with the highly corrosive fluid, of a material selected from titanium, zirconium, or an alloy thereof. The apparatus can be particularly used as an exchanger/reactor, for example as a stripper, in the high pressure cycle of synthesis processes of urea.

31 Claims, 2 Drawing Sheets

U.S. PATENT DOCUMENTS

Figure 1:
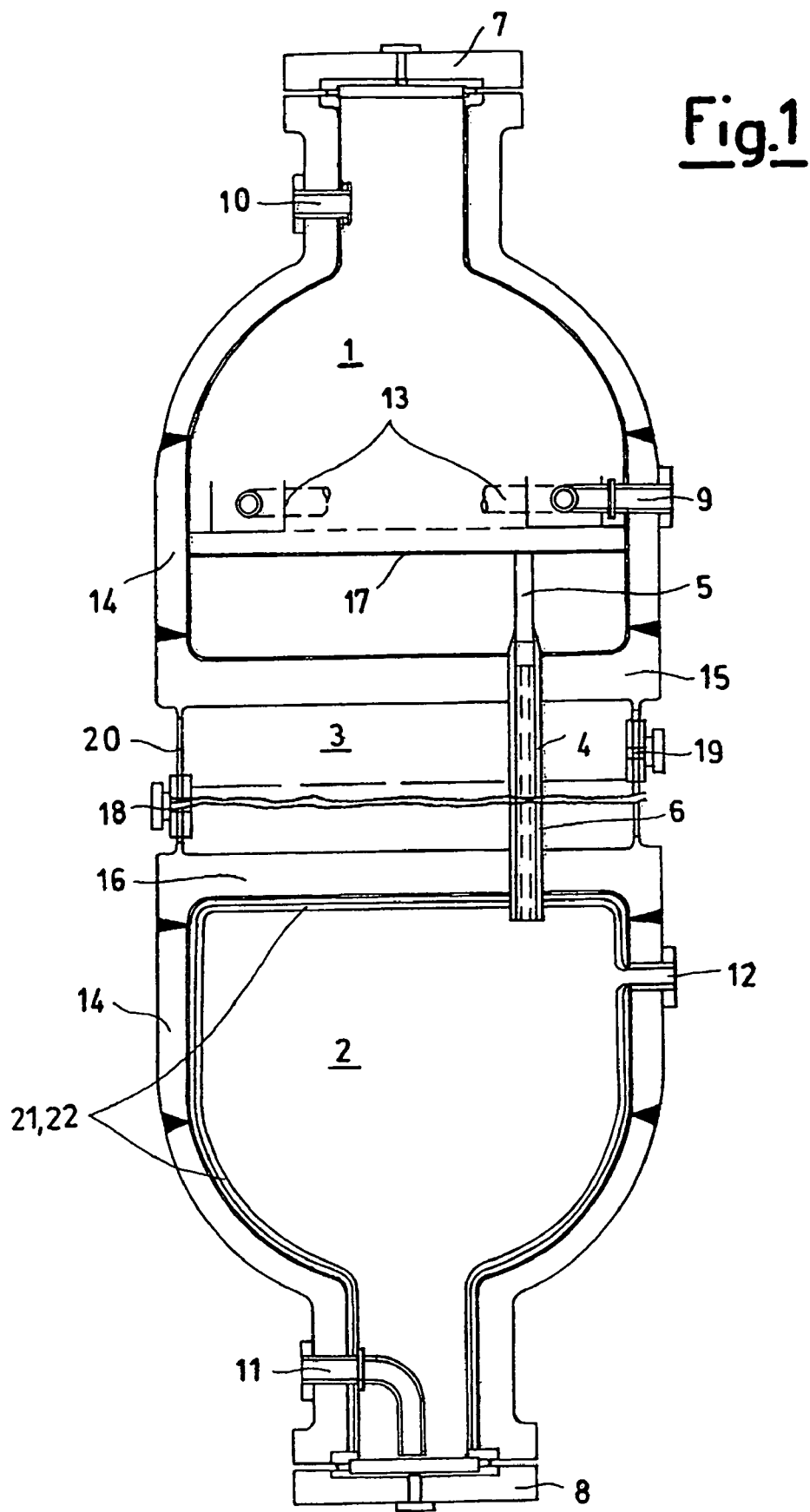

| | | | | |
|---|---|---|---|---|
| 4,368,694 | A | * | 1/1983 | Ward et al. ................... 122/504 |
| 4,617,990 | A | * | 10/1986 | Franzolini et al. ........... 165/173 |
| 4,899,813 | A | * | 2/1990 | Menicatti et al. ............ 165/133 |
| 5,874,178 | A | * | 2/1999 | Takayasu .................... 428/681 |
| 7,048,042 | B2 | * | 5/2006 | Juschka ...................... 165/173 |

FOREIGN PATENT DOCUMENTS

| | | |
|---|---|---|
| JP | 59 044593 | 3/1984 |
| JP | 63 041795 | 2/1988 |

\* cited by examiner

TUBE BUNDLE APPARATUS FOR PROCESSING CORROSIVE FLUIDS

The present invention relates to a tube bundle apparatus for processing corrosive fluids.

More specifically, the present invention relates to a tube bundle apparatus of the type with lining, suitable for processing corrosive fluids at medium or high pressures and temperatures, up to 100 MPa and 400° C. respectively, especially in industrial plants for the production of urea.

The construction technique of high pressure apparatuses, whether they be reactors, separators, boilers, and other equipment in which there is a high thermal exchange, normally comprises the assembly of a compact pressure-resistant body capable of tolerating the operating pressures, guaranteeing the maximum safety and duration with time of the mechanical specifications, equipped with the necessary passages for external communication and control and the entrance and exit of the process fluids. The most widely-used material for this construction is carbon steel, due to its excellent combination of optimum mechanical properties, its relatively low cost and commercial availability. In order to maximize the exchange surface, a tube bundle is usually inserted inside the pressure-resistant body, terminating, on each end, with a plate or perforated drum situated on a fluid collection or distribution chamber. The thermal exchange takes place with a second fluid circulating in a chamber outside the tube bundle, in contact with the external surface of the tubes.

In processes which generate highly aggressive fluids, at least one of the two surfaces of each tube and tube sheet plate and at least a part of the internal surface of the pressure-resistant body are exposed to direct contact with a process fluid having highly aggressive characteristics. Some of the methods and equipment generally used for obtaining thermal exchange in these cases are provided, for example, in the technical publication "Perry's Chemical Engineering Handbook", McGraw-Hill Book Co., 6$^{th}$ Ed. (1984), pages 11-18.

The problem of corrosion has been faced with various solutions in existing industrial plants, and others have been proposed in literature. There are in fact numerous metals and alloys capable of resisting for sufficiently long periods the extremely aggressive conditions which are created inside a synthesis reactor of urea or other apparatuses in processes involving highly corrosive fluids, such as in the synthesis of nitric acid, for example. Among these, lead, titanium, zirconium and several stainless steels such as AISI 316L steel (urea grade), INOX 25/22/2 Cr/Ni/Mo steel, special austeno-ferritic steels, austenitic steels with a low content of ferrite, etc., can be mentioned. An apparatus of this type however would not be economically convenient if it were entirely constructed with these corrosion-resistant alloys or metals, not only due to the considerable quantity of costly materials which would be necessary for the purpose, but also as a result of structural and construction problems due to the necessity of using special welding and bonding methods and, in certain cases, to the lack of certain metallic materials having the excellent mechanical qualities of carbon steel.

Resort is usually made to containers or columns made of normal carbon steel, optionally multilayer, having a thickness varying from 30 to 450 mm, depending on the geometry and pressure to be resistd (pressure-resistant body), whose surface in contact with corrosive or erosive fluids is uniformly covered with a metallic anticorrosive lining from 2 to 30 mm thick.

For example, the processes for the production of urea normally used in industry comprise at least one section which operates at a high temperature and pressure (synthesis cycle or loop), at which the process fluids, i.e. water, ammonia and especially saline solutions containing ammonium carbamate and urea, become particularly aggressive. It is known that normal carbon steel is not capable of resisting the corrosion of these high temperature fluids and when in contact with these, undergoes a progressive and rapid deterioration which weakens its structure causing external losses or even explosions.

In particular, in the production processes of urea currently in use, the ammonium carbamate (hereafter abbreviated with the term "carbamate", as used in the specific field) not transformed into urea is further decomposed to ammonia and carbon dioxide in the so-called high pressure stripper, substantially operating at the same pressure as the reactor and at a slightly higher temperature, which consists of a tube bundle exchanger vertically positioned, in which the solution of urea leaving the reactor and containing non-reacted carbamate and excess ammonia, is sent in a thin layer along the inside of the tubes, whereas medium pressure saturated steam (1-3 MPa) is circulated and condensed, at the temperatures indicated in the project documents, in the chamber outside the tube bundle, to supply the necessary energy for the flash of excess ammonia and decomposition of the carbamate. The pressure-resistant body of the stripper is made of normal carbon steel, whereas the tubes of the tube bundle are generally made of a material resistant to corrosion.

The gases leaving the stripper are usually recondensed in a condenser of the carbamate, also essentially consisting of a tube bundle exchanger, which is therefore in contact with a mixture similar to that of the decomposer (except for urea) and consequently extremely corrosive. Also in this case the internal lining and tube bundle are made of the above-mentioned particular stainless materials.

Production processes of urea which use the above separation and recondensation method of the high pressure carbamate are described, for example, in U.S. Pat. Nos. 3,984,469, 4,314,077, 4,137,262, EP 504,966, all assigned to the Applicant. A wide range of processes normally used for the production of urea is also provided in "Encyclopedia of Chemical Technology", 3$^{rd}$ Edition (1983), Vol. 23, pages 548-574, John Wiley & Sons Ed., whose contents should be referred to for further details.

In the particular case of a tube bundle thermal exchanger, such as the stripper or carbamate condenser forming part of the synthesis cycle (loop) of urea, the solution to problems of corrosion is quite complex due to the particular geometry of the equipment which does not allow a controlled and reproducible distribution of the temperatures and compositions of the fluids, especially when the thermal exchanger is concomitant with chemical reactions. Also in these cases, attempts have been made to prevent corrosion with suitable surface linings of the tube sheet plate and other surfaces in contact with the corrosive fluids, with relative success, but so far without managing to produce an apparatus at reasonable costs, which can be run for sufficiently long times with no extraordinary maintenance.

It is also known that the resistance to corrosion of stainless steels in contact with acid or alkaline saline solutions, such as those of carbamate in water, is considerably increased if these fluids contain a small quantity of oxygen, introduced as air or another compound capable of generating oxygen, such as ozone or a peroxide. This technology has been widely used and is described, for example, in the U.S. Pat. No. 2,727,069 (Stamicarbon) and U.S. Pat. No. 4,758,311 (to the Applicant). Although providing a significant improvement, this technical solution however still has a few disadvantages, due to the greater control necessary for avoiding the formation of areas with a concentration of oxygen close to the explosivity limits, and also because the distribution of oxygen is not uniform, especially in the presence of biphasic gas/liquid systems such as those present in the whole synthesis cycle of urea, and it consequently does not guarantee a satisfactory protection from corrosion in any point of the surface exposed.

Alloys and metals with an higher corrosion resistance than stainless steel, have already been proposed before as heavy-duty materials for the production of reactors for the synthesis of urea. For example, UK 1.046,271 (Allied Chemical Corp.) describes a process for the direct synthesis of urea at 205° C. and 27 MPa in which the reactor is completely made of zirconium. It is evident however that this type of reactor implies high costs and construction difficulties.

Synthesis reactors of urea made of carbon steel lined with zirconium or titanium are mentioned in the publication "Chemical Engineering" of May 13, 1974, pages 118-124, as an alternative to the reactors lined with stainless steel.

Also known are tube bundle exchanger with tubes comprising titanium or zirconium. U.S. Pat. No. 4,899,813 (assigned to the Applicant) describes the construction and use of vertical tube bundle equipment especially suitable for the high pressure stripping of the solution of urea coming from the synthesis reactor. In order to prevent corrosion in the areas inside the tubes, where the thermal exchange and decomposition of the carbamate take place and where the aggressiveness of the fluid is therefore at its maximum, a tube bundle made up of bimetallic tubes has been used, i.e. consisting of an external part made of INOX steel, and an internal very fine part, (0.7-0.9 mm) made of zirconium, attached but not welded to the former. The remaining part of the exchanger/stripper in contact with the urea solution is, on the other hand, constructed with the normal carbon steel technique lined with a suitable stainless steel. This solves problems linked to corrosion inside the tubes, due to the excellent resistance of zirconium, without however creating difficulties associated with the production of special steel/zirconium junctions which cannot be efficiently welded directly to each other, and at the same time maintaining an economic production of the equipment.

In spite of the excellent results obtained with this latter technology, it has been found however that in certain areas of the exchanger, especially concentrated around the lower tube sheet plate of the stripper and in the corresponding chamber, unexpected corrosion phenomena still occur under extremely aggressive conditions of the fluids. The same problem may also arise, over a long period of time, in other tube bundle apparatuses operating under similar conditions of aggressiveness.

The entire lining of said equipment, however, with zirconium, titanium or one or their alloys creates considerable applicative problems, both in terms of construction engineering due to the lack of homogeneity of the welded joints, and also from the point of view of safety, as the weep-hole expedient, even if used according to the known art, would lead, after leakage of the lining, to the direct contact of the corrosive fluid with the underlying carbon steel, rapidly causing structural damage, sometimes even before the loss can be observed.

The problem of the life of pressure equipment exposed to extremely corrosive fluids, especially with respect to the tube bundle apparatuses used in the synthesis cycle of urea, has consequently still not been solved in a satisfactory manner.

During its activities aimed at continuously improving its technology, the Applicant has now found that the above problems relating to tube bundle apparatuses, with tubes comprising an anticorrosive material different from stainless steel, can be surprisingly overcome by adopting a particular type of multilayer lining of the non-tube part exposed to corrosion fluids. This new approach also allows a reduced quantity of heavy-duty anti-corrosive material to be used for the lining, significantly increasing however the operative life of the equipment.

A first object of the present invention therefore relates to a tube bundle apparatus suitable for efficiently effecting the thermal exchange, under high pressure and temperature conditions, between at least two fluids of which one has highly aggressive characteristics under the process conditions, comprising a hollow body equipped with an external casing, or pressure-resistant body, suitable for tolerating the operating pressures and consisting of a material subject to corrosion by contact with said highly aggressive fluid, and appropriate openings for the entrance and exit of the fluids, inside which there are at least two cavities separated from each other by a third sealed cavity with respect to these, situated between two septa or plates hinged onto the pressure-resistant body, said two cavities communicating with each other by means of a series of tubes, whose internal wall is put in contact with said highly aggressive fluid and consists of a material selected from titanium, zirconium or an alloy of one of them which is highly resistant to corrosion, forming a tube bundle situated between said two septa which passes through said third cavity, characterized in that at least one of said two cavities is in contact with said highly aggressive fluid and is at least partly delimited by a wall comprising at least three metallic layers consisting of:

A) an external layer suitable for tolerating the pressure load, subject to corrosion by contact with said highly aggressive process fluid;

B) an intermediate layer made of stainless steel;

C) an anticorrosive layer in contact with said highly corrosive fluid, consisting of a material selected from titanium, zirconium or an alloy of one of them.

A second object of the present invention relates to a method for the production of said apparatus.

Other objects of the present invention will be evident for experts in the field from the present description provided hereafter.

The term "alloy of" as used herein with reference to a certain metal, refers to an alloy comprising said metal in a quantity of at least 40% by weight.

In accordance with the present description, the term "corrosion resistant" referring to a material with respect to a fluid under certain process conditions, defines a material having a corrosion of less than 0.1 mm/year measured according to the regulation ASTM A 262 section C HUEY TEST, particularly adopted for current linings made of 25/22/2 stainless steel. Corrosion indexes for materials of normal industrial use are provided in various handbooks known to experts in the field, such as, for example, in tables 23-22 to 23-24, of the above-mentioned "Perry's Chemical Engineering Handbook", under the item Ammonium Carbamate.

The term "strength welding" and "seal welding", as used in the present description and claims, refer to the following definitions taken from the regulation ASME VIII Div. 1 UW20:

a strength welding is a welding with such characteristics as to satisfy the project prescriptions, on the basis of the mechanical characteristics and stress deriving from the expansion of the welded parts;

a seal welding is effected with the purpose of avoiding losses and its dimensions are not determined on the basis of the loads previously expressed for strength welding.

The pressure equipment according to the present invention can be used for efficiently effecting thermal exchange operations between two mono or multi-phasic fluids, one of which has characteristics of high corrosiveness towards normal carbon steels, and a moderate corrosiveness, also occasional, towards stainless steels. The latter materials are well known to experts in the field and generally consist of alloys based on iron, chromium and carbon, the latter in smaller quantities with respect to common steels. For special applications, certain stainless steels also contain varying quantities of nickel, molybdenum, manganese. The good resistance to corrosion is due to the property of these alloys of passivating in a sufficiently oxidizing environment, by the formation of a surface film of oxide which is inert and mechanically stable. Several examples of these steels are provided, among the numerous publications available, in the above-mentioned "Perry's Chemical Engineering Handbook", from pages 23-39 to pages 23-41 and especially tables 23-10 to 23-15.

The process fluids having a high aggressiveness referred to in the present invention can be monophasic, i.e. usually consisting of one liquid, or multiphasic, normally biphasic, consisting of a liquid phase and a vapour phase in equilibrium. Typical fluids of this kind are those present in chemical processes such as the production of nitric acid, the production of melamine ad particularly those circulating in the high or medium pressure section of a synthesis plant of urea, such as aqueous or aqueous/ammonium carbamate or urea and carbamate solutions present in the carbamate decomposer or stripper, downstream of the reactor, or in the carbamate condenser.

The latter equipment normally operates at pressures ranging from 10 to 40 MPa and temperatures from 70 to 300° C., in the presence of mixtures containing water, ammonia, carbon dioxide and ammonium carbamate which is the condensation product of said compounds according to the reaction:

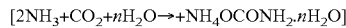

$$[2NH_3+CO_2+nH_2O \rightarrow +NH_4OCONH_2.nH_2O]$$

The operating conditions are preferably a pressure of 12-25 MPa and a temperature of 120 and 240° C.

In the usual industrial plants for the production of urea, to which the present invention particularly refers, the above equipment included in the high or medium pressure section normally contains volumes ranging from 2000 to 100000 liters.

The pressure equipment according to the present invention can have various forms and geometries, both internally and externally, depending on the function for which it is used. It is appropriately constructed in accordance with the typical criteria of high pressure tube bundle thermal exchangers. It is therefore normally cylindrically shaped with two hemispherical caps at the ends of the cylinder, for a better distribution of the pressure load. Openings are conveniently situated in the hemispherical caps and along the cylindrical body for the entrance and exit of the fluids, the introduction of possible sensors and an opening for inspections (man hole). Depending on the use, it can also be positioned horizontally, as for example in the case of a condenser for carbamate, or vertically, as in the case of a stripper.

The external wall of the apparatus, which resists almost all of the pressure load, consists of a thick carbon steel casing, also called pressure-resistant body, having a thickness calculated in relation to the pressure to be resistd and usually varying from 20 to 350 mm. In high pressure exchangers, the external wall can conveniently have different thicknesses in relation to the pressure which must be effectively resistd. The central cylindrical zone, in contact with the steam at pressures ranging from 0.2 to 5 MPa, preferably has thicknesses varying from 20 to 100 mm, whereas the wall of the caps and cylinder close to these, subjected to the usually higher pressure of the process fluids, has proportionally greater thicknesses, preferably from 100 to 300 mm. The outer wall can consist of a single layer or several layers of carbon steel, assembled according to the known art.

Inside the apparatus, there are at least three distinct cavities (or chambers) which are separated from each other by two septa or plates suitably arranged transversally to the main axis of the apparatus, and also comprising a flat carbon steel element, normally having a thickness of 40 to 400 mm, suitable for tolerating the pressure difference usually existing between the cavities defined thereby. In the most common case, the two plates are each situated close to one of the two caps and create a central volume having an essentially cylindrical geometry. Each plate is sealed onto the circular wall by welding, so that there can be no exchanges of material between adjacent cavities. Alternatively, said plates form two cavities situated on the same side of the apparatus, separated from each other by a further septum or plate, as for example in the typical construction technique of the Kettle-type carbamate condenser, in which the two plates are joined in a single transversal plate having one side divided in half by a septum welded transversally.

In the tube bundle apparatus object of the present invention, a series of tubes is fixed between the two plates, which are consequently appropriately perforated and commonly called tube sheet plates, so that a fluid can pass between the two cavities situated at the end. A second fluid, preferably a steam/water mixture, is circulated in the intermediate cavity to effect thermal exchange through the wall of the tubes.

The number of tubes varies according to the project specifications, but normally varies from a minimum of 2 up to about 10000 for larger equipment. There are preferably from 100 to 5000 tubes, and their diameter ranges from 10 to 100 mm. The length of the tubes usually coincides with the length of the central body of the apparatus and preferably ranges from 1 to 10 m, their shape is generally linear, but tubes comprising curved or toroidal parts are not excluded, and their thickness ranges normally from 2 to 25 mm, according to the load and the tube diameter. Intermediate septa (also called baffles) can be situated in the intermediate cavities to support the tubes. These are generally made of carbon steel and have thicknesses of a few millimeters, as they do not have to resist any pressure load.

According to the present invention, the inner wall of each tube consists of a material highly resistant to corrosion, selected from titanium, zirconium or an alloy of one of them possibly comprising other metals. In a first embodiment, each tube consists entirely of one of said materials, preferably zirconium, and has a thickness ranging from 2 to 15 mm, preferably from 3 to 10 mm.

According to a second embodiment, at least two metallic layers, an external layer, preferably having a greater thickness, consisting of a material relatively resistant to corrosion in the presence of fluids containing passivating agents, such as a stainless steel, which is also suitable for tolerating the difference in pressure between the inside and outside of the tube, and an internal lining layer, preferably thinner, made of said material selected from titanium, zirconium or one of their alloys, which is in direct contact with the corrosive fluid. In this case, the ratio between the thickness of the stainless steel layer and the thickness of the lining layer preferably ranges from 1 to 20, more preferably from 2 to 8. The thicknesses are commonly 1-20 mm, preferably 2-15 mm, for the external layer and 0.5-3 mm for the lining layer.

Said bimetallic tubes can be obtained using the normal metallurgical techniques for the production of metallic linings made of special metals such as zirconium or titanium. A preferred technique is described in the above-mentioned U.S. Pat. No. 4,899,813, whose contents are incorporated herein as reference. The lining of said tubes more preferably consists of zirconium with a purity higher than 97%.

The process fluid having a high corrosiveness is situated inside the caps at the end of the apparatus and flows inside said tubes, forming the fluid with a greater pressure. Saturated steam is usually fed into the intermediate cavity at pressures varying from 0.2 to 5 MPa, which, on condensing, releases the necessary quantity of heat, for example, for decomposing the carbamate.

At least one of the cavities in which the inside of the apparatus according to the present invention is subdivided, is put in contact with a fluid which is highly corrosive, under the usual process conditions, not only towards normal carbon steel but also towards stainless steels normally used in the art, even though in this case the corrosion effects can become manifest after cycles of a certain duration. The Applicant has found that it is possible to guarantee the safety and reliability with time of the equipment subjected to such heavy conditions of use, by either totally or partly effecting the construction of said cavities exposed to corrosion by means of the above structure comprising at least three layers of a different material. According to a preferred aspect for greater economic advantages, it is possible, in fact, to use the three-layered structure only in the areas exposed to major risk of corrosion, still obtaining however an apparatus with the excellent characteristics indicated above. In accordance with the present invention, the layer (A) essentially consists of carbon steel and can at least partly coincide with the external casing of the head. The thickness of this layer depends on the maximum operating pressure of the apparatus and preferably varies from 20 to 500 mm. It can also have different thicknesses in correspondence with different points of the same cavity, such as for example, the thickness of the layers forming the perforated plate with respect to the thickness of the head. In particular, the thickness of the layer A of the perforated plate preferably ranges from 40 to 500 mm, whereas that of the external wall is usually less and preferably ranges from 40 to 350 mm.

The carbon steels which form the layer A are typically selected from those normally used in the metallurgical field as construction material with high mechanical properties such as elasticity, ductility and hardness (see for example the above-mentioned publication "Perry's Chemical Engineering Handbook", pages 23-15).

A second laminar layer B consisting of stainless steel is arranged on at least a part of the surface of the layer A of said cavity. The thickness of the layer B preferably ranges from 1 to 40 mm, more preferably from 3 to 25 mm. Stainless steels suitable for the production of the layer B are generally those with a high resistance to corrosion, typically those mentioned above. Stainless steels suitable for the purpose are, for example, AISI 316L steel, INOX steels, especially 25/22/2 Cr/Ni/Mo, special austenitic-ferritic steels, and others usually known to experts in the field. The selection of the most suitable material can be left to experts in the field, on the basis of the performances desired during the operation. Typical examples of said steels are those commercially available under the following trade-names: "2 RE 69" (®, SANDVIK), "724 L" (®, AVESTA), "725 LN" (®, AVESTA), "DP 12" (®, SUMITOMO).

According to the present invention, not all of the internal surface of the cavity in contact with the corrosive process fluid should necessarily consist of said three layers A, B and C but, if necessary, certain areas or parts of the surface can consist of layers A and C alone, closely connected with each other. Experts in the field can determine, during the project, whether said cavity can be entirely or partially bordered by a three-layered wall according to the present invention, on the basis of the data and tests available for the process and equipment in question. On the basis of observations made of the most critical areas, at least 25%, preferably at least 40% of the surface of said cavity is usually bordered by a three-layered structure.

According to a simplified embodiment of the present invention, it has been found that it is sufficient for the tube sheet plate alone to consist of said three-layered structure, whereas the remaining surface of the cavity (or head, typically hemisferical) can conveniently consist of layers A and C alone. In this way, a simplified and less costly structure is obtained, which in any case allows the desired results to be achieved as it helps to improve the performances in the more critical areas.

According to a preferred aspect of the present invention, said cavity in contact with the process fluid is entirely bordered by said three-layered wall A-B-C, suitably shaped, which has the further advantage of guaranteeing the structural continuity of the whole apparatus.

When the exchanger comprises bimetallic tubes, for example of the type mentioned hereinabove, the B layer is strength welded to the stainless' steel layer of each of them near the outlet on the surface of the tube sheet plate, in such a way as to secure the seal with respect to the underlying carbon steel and resist the axial stress of the tube. In accordance with the present invention, it is not necessary for the layer B and steel of the bimetallic tube to be made of the same material, but they should be appropriately compatible to allow them to be welded together. The carbon steel and various stainless steels can generally be strength welded to each other with satisfactory results in terms of seal and load tolerance. On the other hand, when at least some tubes of the tube bundle are entirely made of a material selected from titanium, zirconium or an alloy thereof, said B layer on the tube sheet plate acts essentially as a protective intermediate layer, whereas the tubes are preferably strength welded to a suitably shaped C layer.

According to the present invention, said third layer C is arranged on said layer B, in close contact therewith. It consists of a metallic material selected from titanium, zirconium or one or their alloys, preferably zirconium or one of its alloys containing at least 90% by weight of zirconium, more preferably pure zirconium. Said layer C forms a cover or internal lining of the wall of the cavity in direct contact with the process fluid. It has a thickness which is suitable for tolerating mechanical and thermal stress for long periods during use; it preferably has a thickness ranging from 0.2 to 10 mm, more preferably from 0.5 to 5 mm. Possibly, the thickness of the layer C, as well as that of the layers A and B, can also be different in different areas of the apparatus or even of the same cavity, depending on the different geometry, different load or characteristics of the fluid in contact therewith. In particular, on the tube sheet plate the thickness of the C layer is advantageouly close to that one of the corresponding layer of titanium, zirconium or an alloy thereof in the tube bundle. Therefore, it ranges preferably from 0.2 to 4 mm, more preferably from 0.5 to 3 mm, in the presence of bimetallic tubes, wherein the C layer is seal welded to the inner layer thereof. When said tubes entirely consist of one of the said non-ferrous metals or alloys, the C layer is preferably strength and seal welded to the tubes and its thickness ranges from 2 to 10 mm, preferably from 3 to 5 mm, Titanium, zirconium and their alloys with certain other metals are known to be among the most corrosion-resistant metallic materials. In addition to pure metals, Ti—Zr alloys and anticorrosive alloys of titanium or zirconium with other metals can be used in accordance with the present invention. Some of these materials are commercially available in formats suitable for the preparation of linings according to the usual metallurgical techniques. References to titanium, zirconium and their alloys are made, for example, in the above-mentioned "Perry's Chemical Engineering Handbook", pages 23-50, tables 23-19. In general, it is preferable for the layer C to consist of the same metal or alloy which forms the internal lining of the bimetallic tubes of the tube bundle, more preferably it consists of zirconium.

The layer C generally consists of a metallic material which cannot be welded with the materials forming said layers B and A, and it is therefore arranged in contact with, resting on or penetrated with these, but not welded onto their surface. When the layer B is only present in certain areas of the wall of said cavity, as for example in the above-mentioned case of the tube sheet plate in the high pressure stripper in the synthesis of urea, said layer C, which on the contrary preferably extends on the whole surface exposed to corrosion of the cavity and forms the first protective lining, can form a double layer A-C with the underlying carbon steel in the remaining area. The thickness of the layer C in this latter case is preferably greater than that situated on the three-layered wall.

In the area of the tube sheet plate, the layer C is seal welded with the internal lining of each bimetallic tube, in order to prevent contact between the process fluid and underlying layer B. Suitable techniques for this welding are generally known to experts in the field and are illustrated in more detail below.

The structure of the three-layered wall according to the present invention surprisingly allows a series of drawbacks remaining unsolved by experts in the field, to be overcome. When the tube bundle is made of bimetallic tubes, the strength welding of these latters with the stainless steel layer B on the tube sheet plate ensures the structural consistency of the apparatus, while the arrangement of the subsequent layer C made of a material analogous to that of the internal lining of the tube, ensures a long-lasting seal and protection from the process fluid. In the absence of the C layer, the particular aggressiveness of the fluids in the area of the tube sheet plate, together with a particularly complex geometry, makes the resistance of stainless steel alone insufficient and results in an unsatisfactory duration with respect to the desired productive cycles. On the other hand, the use of the layer C alone on the layer A, without the layer B, would create considerable difficulties for the strength welding of the bimetallic tube which could not be effected on the metal of layer C, due to its incompatibility with stainless steel. Moreover, when the tubes are entirely made of titanium, zirconium or an alloy thereof, a C layer with a suitable thickness allows an adequate strength welding to be obtained to each tube, while the intermediate layer B provides a satisfactory safety level in case of leaking, particularly along the said weldings.

According to a preferred aspect of the present invention, small-sized holes called weep-holes are produced in certain points of the wall of the pressure-resistant body which borders each cavity in contact with the corrosive fluid, with the purpose of revealing possible losses of the internal lining before the carbon steel of layer A undergoes significant damage due to corrosion. A weep-hole normally consists of a small tube having a diameter of 8-15 mm made of corrosion-resistant material, which is inserted in the pressure-resistant body until it reaches the contact point between the latter and the lining consisting of alloy or corrosion-resistant metal. If there is a loss in the lining, as a result of high pressure, the internal fluid, which is corrosive, immediately spreads to the interstitial area between the lining and the pressure-resistant body and, if not detected, causes rapid corrosion of the carbon steel of which the latter consists. The presence of weep-holes allows these losses to be detected. For this purpose, all the interstitial areas beneath the anti-corrosion lining are usually put in communication with at least one weep-hole. The number of weep-holes usually ranges from 2 to 4 for each ferrule.

Although the use of the weep-hole technique has been known for a long time in the art, the particular three-layered structure of the walls of the present apparatus, or part of these, allows the safety of the whole end-product to be improved by producing weep-holes which cross both layers A and B and by lining them with stainless steel. In this way, a possible loss through the fine layer C, due for example to an unexpected mechanical abrasion or structural defects of the lining, would bring the corrosive fluid in contact only with the stainless steel which, however, has a sufficient resistance to corrosion as to enable the loss to be detected without there being any significant damage to the structural elements of the pressure-resistant body.

According to a particular aspect of the present invention, a further layer D, of carbon steel, can be possibly inserted between said B and C layer, especially aimed to constitute a suitable surface for the arrangement of the C layer by the known technique of explosive cladding, whereby an explosive charge is blown up on a metallic plate of the C layer to press it onto the underlying D layer at a such very high pressure as to obtain a substantial adherence of the two layers, although no welding between them. The thickness of said D layer is conveniently selected between 2 and 10 mm.

A particular example of the apparatus according to the present invention, relating to a high pressure stripper of a plant for the production of urea, is illustrated below with reference to the drawings provided in the enclosed figures, without limiting however the overall scope of the invention itself.

FIG. 1 schematically represents a perspective view of the longitudinal section of a high pressure stripper used for the decomposition of carbamate in a synthesis plant of urea, according to the present invention.

Figure 2:
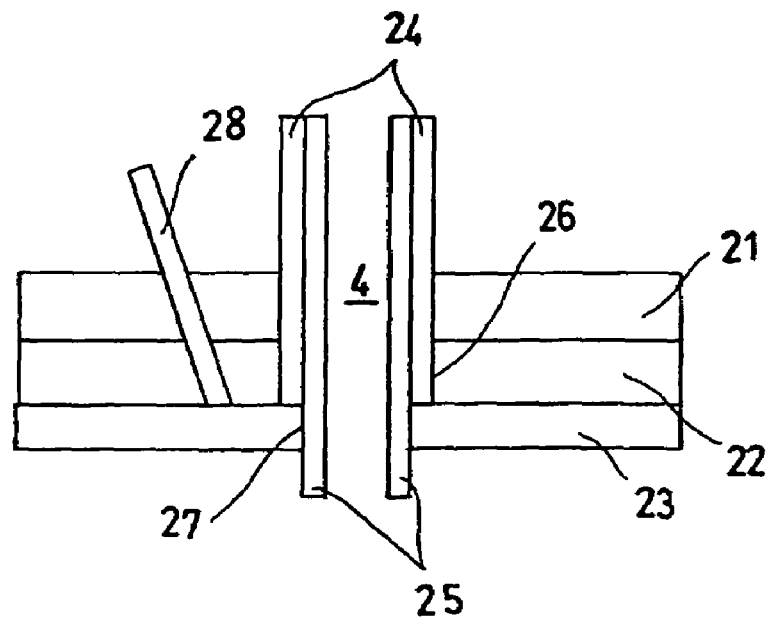

FIG. 2 schematically represents a detail of the above FIG. 1, relating to the formation of the junction area between said tube belonging to the tube bundle and the lower supporting plate.

Figure 3:
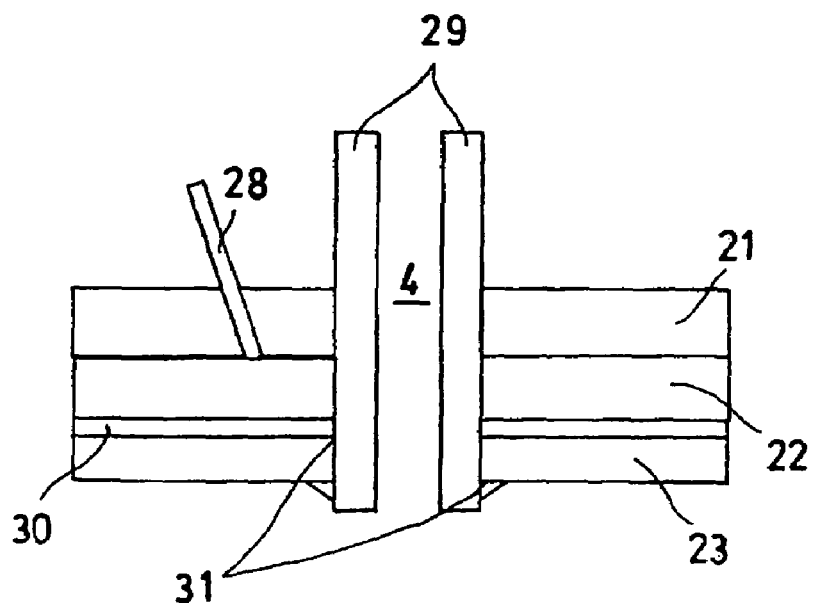

FIG. 3 schematically represents an analogous detail of the said FIG. 2, but relating to the tube sheet plate of a heat exchanger according to the present invention wherein the entire tube bundle is made of zirconium tubes.

For the sake of greater simplicity and figurative clarity of the details, only one tube of the bundle is illustrated in the figures and the dimensions are not proportional to the real dimensions.

The stripper illustrated in FIG. 1 is positioned vertically and essentially consists of three hollow sections, the upper chamber 1, having a hemispherical shape, the intermediate chamber 3 having a cylindrical shape, through which the tube bundle passes, and the lower chamber 2 having a hemispherical shape. The diameter of the cylindrical section is about 1.5-2 meters and the length is about 4-6 meters. At the upper and lower end of the apparatus there are two man-holes 7 and 8 respectively, whereas chambers 1 and 2 are separated from chamber 3 by two tube sheet plates 15 and 16 respectively, each having from 1500 to 4000 holes for the discharge of the tubes. The rest of the wall of the two chambers 1 and 2 is bordered by the pressure-resistant body 14.

The solution coming from the synthesis reactor of urea, having a temperature of about 180-200° C. and a pressure of about 14-17 MPa, comprising urea, water, excess ammonia, non-converted carbamate, reaches the upper chamber 1 from line 9, and is distributed by means of the toroid 13. The liquid, indicated by the level 17, collects on the bottom of the chamber, and drips into each tube 4 forming a fine layer, whereas vapours of ammonia and carbon dioxide pass through the central part of the tube in countercurrent and are released in the decomposition and stripping phase. These vapours are subsequently discharged through line 10.

The whole internal surface of chamber 1 is lined with stainless steel, for example 25/22/2 Cr/Ni/Mo (urea grade) having a thickness of about 3-10 mm, preferably 5 mm, which has a satisfactory resistance to the process fluids under the existing conditions.

The central section of the apparatus comprises the cylindrical chamber 3, externally bordered by the wall 20 made of carbon steel, usually having a thickness ranging from 10 to 40 mm, through which the tube bundle passes, into which saturated steam is fed, through the inlet 19, at a pressure of about 2-3 MPa and a temperature ranging from 200 to 240° C., which circulates outside the tubes and condenses on the external wall of these, supplying heat to the aqueous solution of urea and carbamate which flows inside. The condensation liquid of the exhausted steam is then discharged from line 18. In this way, the carbamate is decomposed and the excess ammonia vaporized, which also acts as stripping agent. Each tube 4 of the tube bundle consists of an external stainless steel layer, for example 25/22/2 Cr/Ni/Mo (urea grade), having a thickness of about 2-3 mm, internally lined by a non-welded layer of zirconium having a thickness of about 0.7-0.9 mm, and is produced according to said U.S. Pat. No. 4,899,813. The relatively fine thickness of the latter allows problems of distortion which normally occur in elements consisting of two metallic layers having very different thermal expansion coefficients, to be avoided, guaranteeing however the desired protection from corrosion. A distributing ferrule 5 having lengths ranging from 200 to 600 mm is inserted in the upper part of the bimetallic tube, whose purpose is to determine the level of liquid in chamber 1 and its uniform distribution inside the bimetallic tubes.

This end 5 of the tube does not require an internal zirconium lining and is normally made of 25/22/2 Cr/Ni/Mo. The remaining part 6 of each tube, which extends along the chamber 3 until it is fixed onto the lower plate 16, is, on the contrary, bimetallic and each end rests on one of the perforated plates by means of a strength and seal welded structure which is described in detail below with reference to FIG. 2.

The lower chamber 2 is bordered by a pressure-resistant body 14 analogous to chamber 1, and by a lower tube sheet plate 16. The conditions of major aggressiveness and corrosion to the internal wall occur inside this chamber, and especially in the area of the tube sheet plate, where the aqueous solution of urea, coming from the tube bundle, flows. The solution of urea purified for the most part from the carbamate, is collected on the bottom of chamber 2 and is forced into the siphon 11 from which it then proceeds towards the other purification and drying sections. Additional ammonia, if necessary, or carbon dioxide can be charged through the inlet 12, according to an alternative technology, to favour the stripping. Passivation air is also introduced through the same inlet, when required.

According to the present invention, the wall of chamber 2 (pressure-resistant body and tube sheet plate) comprises three superimposed metallic layers, consisting respectively of carbon steel, stainless steel and zirconium, as illustrated below in more detail with reference to the scheme represented in FIG. 2, relating to the conjunction area of a bimetallic tube with a tube sheet plate.

FIG. 2 essentially illustrates the section of the pressure-resistant body 21 which forms layer A made of carbon steel, having a greater thickness, usually 100-400 mm, the stainless steel section 22, which forms layer B, on whose surface the lining 23 consisting of a fine zirconium layer C, rests.

The layer 21 in this case coincides with the body of the tube sheet plate 16 and is dimensioned so as to tolerate the stress due to the pressure difference between the lower chamber 2, for collecting the aqueous solution of urea, and the intermediate cylindrical chamber 3, where the steam is condensed. This pressure, for normal urea production processes, ranges from 14 to 18 MPa, preferably 15-16 MPa. Close to a tube 4 belonging to the tube bundle, the layer 21 is suitably perforated and possibly welded to the tube itself along the edge of the hole.

On the side facing the cavity 2 of the layer 21, there is a laminar layer 22 made of stainless steel which forms layer B according to the present invention. This preferably has a thickness ranging from 3 to 20 mm and in this particular case is made of a "urea grade" stainless steel. "Urea grade" refers to a commercial type of stainless steel with a particular resistance to corrosion of solutions of ammonium carbamate. Austenitic and "urea grade" INOX are among the preferred steels. The laminar layer 22 can consist of laminar elements having a suitable thickness, welded with each other and the underlying layer 21, or, especially in the case of a tube sheet plate, a welding deposit. Near the cross point and discharge into the cavity 2 of a tube of the tube bundle, the layer 22 is strength welded with the external layer 24 of the tube by means of circular welding 26, so that the two layers form a continuous and sealed structure with respect to the carbon steel of layer 21.

The layer 23 consisting of the anticorrosive lining C of the present invention, rests on the surface of the layer 22 facing the cavity 2. This preferably consists of zirconium with a thickness ranging from 2 to 3 mm. The layer 23 is arranged so as to perfectly adhere to or penetrate the surface of layer 22. This is obtained with various welding methods (not usable in this case) such as, for example, explosive cladding, or thermal spraying.

Close to the discharge of each bimetallic tube 4, said layer 23 is superimposed with respect to the welding 26 of the stainless steel layer B and is directly joined with the internal lining 25 of the tube by means of seal welding 27, arranged around the discharge hole. A part of the lining 25 is preferably extended for a few centimeters beyond the layer 23 to favour the dripping of the liquid.

According to a particular aspect of the present invention, a certain number of weep-holes (schematically indicated with by reference 28 in FIG. 2) are produced through layers 21 and 22 (i.e. A and B) of the wall of the cavity 2, both laterally in the tube sheet plate and in the wall of the head, protruding below the layer of lining 23. These weep-holes are produced according to any of the various techniques normally in use and are internally lined with stainless steel or even with the same material as layer 23.

In FIG. 3 essentially the same features are shown as illustrated and numbered according to FIG. 2, but tube 4 entirely consists in this case of a cylindrical zirconium wall 29, having for example a thickness of 4-5 mm and a diameter (internal) of 20-50 mm, preferably 30-40 mm, capable to resist the pressure difference of about 15-16 MPa between the inner and outer fluids.

Near and around its outlet in the lower cavity, each tube 4 is strength and seal welded to the layer 23 of the tube sheet plate, which constitutes the inner lining the cavity itself, by mean of the welding 31 arranged all around the outlet hole and all along the tube-plate contact surface. According to a particular embodiment of the present invention, a further carbon steel layer 30 (D layer), having a thickness of from 1 to 3 mm, is placed and welded on the surface of said stainless steel layer 22, in order to facilitate, in the construction of the equipment, the step of laying the zirconium lining layer 23 by mean of the known technique of explosive cladding. In this case, the weep-holes made in the area of the plate or the head wall comprising the said four layers, are conveniently extended through the layer 30 to reach the surface underlying the lining layer 23.

A second aspect of the present invention relates to a method for the production of said tube bundle apparatus with enhanced performances.

In accordance with this, the method for the production of the tube bundle apparatus according to the present invention, especially suitable for effecting thermal exchanges between fluids of which one has a high chemical aggressiveness, comprises the construction of a hollow body with an external casing, or pressure-resistant body, appropriate for tolerating the operating pressures and consisting of a material subject to corrosion by contact with said highly aggressive fluid, and the formation, inside said hollow body of at least two cavities separated from each other by a third seal cavity with respect to these, by the interpositioning of at least two plates, or septa, hinged to the pressure-resistant body, on which, to put said cavities in communication with each other, a series of tubes is inserted, forming a tube bundle, whose internal wall consists of a material selected from titanium, zirconium or an alloy of one of these, highly resistant to corrosion, so that during use, said internal wall of the tubes and the wall of at least one of said two cavities is in contact with said highly aggressive fluid, said method being characterized in that the wall which borders at least one of said cavities is at least partly produced by superimposing the following three metallic layers in order:
A) an external layer suitable for tolerating the pressure load, subject to corrosion by contact with said highly aggressive process fluid;
B) a stainless steel intermediate layer;
C) an anticorrosive layer constituting a lining situated on the internal surface in contact, during use, with said highly corrosive fluid, consisting of a material selected from titanium, zirconium or an alloy of one of these, seal welded with the internal wall of each of said tubes.

The whole wall which borders said cavity in contact with the highly aggressive fluid is preferably made up of the above three-layered structure.

In the preferred case of the production of a stripper for the urea solution, said cavity in contact with the corrosive fluid is the lower one, whereas the upper cavity, in contact with the solution of urea and carbamate under blander conditions, does not require the three-layered structure, but consists of layers A and B only.

In a preferred embodiment of the present invention, said method of production comprises the arrangement of a bundle of bimetallic tubes, as previously described.

The production of the anticorrosive lining which forms layer C according to the present invention, can be effected according to any of the suitable metallurgical techniques known in the art, such as, for example, the positioning, on the surface of the layer B, of laminar elements made of the preselected metal or alloy, suitably cut and shaped to adapt themselves to the form of the surface to be covered. The elements are arranged side-by-side and subsequently seal welded to each other. Grooves, supports, connecting elements and other devices or end-products are situated, especially along the edges to be welded, according to the normal procedure know to experts in the field. Welding methods of metals such as zirconium, titanium and their alloys, although less common than the welding of steels, are known and can be easily applied.

According to an embodiment of said manufacturing method, with respect to the wall of the lower cavity of a high pressure stripper for the decomposition of carbamate and the purification of a solution of urea, a second layer B consisting of stainless steel plates resting on the pressure-resistant body and anchored thereto by means of a welding process, is applied to the pressure-resistant body A essentially consisting of carbon steel plates calendered and welded. The thickness of these plates preferably ranges from 3 to 10 mm, and is more preferably 5 mm. Said plates are cut and welded by the edges, according to the usual manufacturing technique of linings for equipment used in the synthesis of urea, to an underlying stainless steel welding deposit applied to fill a series of grooves having a depth of about. 3 mm and a width of about 20 mm, previously produced on the carbon steel surface with a suitable geometry corresponding to the shape of the plates. Below the grooves, at an adequate distance between each other, preferably from 500 to 1500 mm, a certain number of weep-holes are subsequently produced in the pressure-resistant body and through said welding deposit, reaching the surface of the latter, with the purpose of monitoring losses during the running of the apparatus.

In a second preferred manufacturing phase, a small zirconium plate, acting as a support, is positioned on said welding deposit, in the space left free by the stainless steel plates. Additional zirconium plates having a varying thickness as described above, not less however than 3 mm, are subsequently applied and welded to each other and onto the underlying zirconium support until the surface of the lower cavity (or bottom) of the stripper is entirely covered. The welding technology of this metal, as also titanium and its alloys, is known, but is generally more complex than that of steel and must be carried out in a stream of inert gas, normally argon. The weep-holes also have the advantageous function in this phase of ensuring the necessary protection of inert gas to the underlying surface of the zirconium plate, by means of insufflation with argon.

The production of the tube sheet plate of said lower cavity with the three-layered structure according to the present invention, is preferably effected with a variation of the method described above, which also forms a part of the present invention. In particular, it comprises the following construction phases in succession.

A series of holes having adequate dimensions for receiving the tubes destined for effecting the thermal exchange are produced on the tube sheet plate, whose sizes depend on the project specifications, but usually consisting of a circular septum essentially made of carbon steel (resistant body) having a thickness ranging from 300 to 350 mm. The tube sheet plate is then lined, on the side facing the lower cavity, with a layer B consisting of a welding deposit made of stainless steel 25/22/2 Cr/Mo/Ni by means of the usual welding processes (for example submerged-arc welding). The tubes are subsequently inserted into the holes produced above. If the tubes are of the said bimetallic type, made up of an external stainless steel layer and an internal zirconium layer, the external layer of each tube is then strength welded with the above layer B, followed by a suitable mechanical processing of the surface of the tube sheet plate to allow the positioning of the subsequent zirconium layer or to ensure an effective and long-lasting protection of the corrosion to the underlying inox steel layer. If the tubes are entirely made of one metal or metallic alloy, said layer B is arranged tightly around each tube, and, if required, can be seal welded to it by the known special methods suitable for this aim.

In the subsequent phase, after processing the tube sheet plate, one or more zirconium plates of suitable thickness (free lining), sized and shaped so as not to block the outlets of said tubes, are laid on the surface. These are subsequently connected to each other, with the protrusion of the internal zirconium layer of the bimetallic tubes by a seal welding which seals the whole surface of the plate exposed to contact with the process fluid. If the tubes are entirely made of one of said highly corrosion resistant metals or metal alloys, for example of zirconium, the C layer, usually up to 10 mm thick, is strength and seal welded to the whole outlet zone of the tube.

In the welding phase, all the interstitial surfaces are preferably protected by an atmosphere of argon through suitable weep-holes produced in the tube sheet plate with a technique analogous to that described above.

According to a particular embodiment of the method according to the present invention, which has never been applied to this type of tube bundle equipment destined for use in a corrosive environment and in particular strippers adopted in synthesis plants of urea, said zirconium layer C on the surface of the lower cavity and plate of the stripper can also be produced by means of one of the thermal spray techniques known in the art. These techniques allow a continuous and uniform layer of a metal, closely connected with the underlying metal, to be laid, by the high temperature spraying of powders or vapours thereof onto the surfaces to be coated. In this way surface coatings having a complex geometry can be obtained, with uniform metallic layers and with the desired thickness, sometimes also much thinner than those obtained by the deposition of plates as described above, with a consequent significant saving in material. Thermal spray techniques are described, for example, in the publication "AWS Welding Handbook", volume 4, Seventh edition.

According to a preferred aspect of the present invention, said layer C is obtained by means of the spray arc technique. In all the essential variables relating to processes in use, this is a technique which is well-known for applications of hard or anticorrosive deposit on surfaces made of carbon steel or other materials among which austenitic stainless steels, and is used whenever it is necessary to combine mechanical characteristics of toughness in the core of the product, with high resistance properties to erosion or corrosion on the surface, as it forms a close and firm union between the underlying metallic surface and its lining, even if the metals of the two layers cannot be effectively welded to each other. It has never been applied however to the manufacturing of parts of tube bundle equipment in contact with highly corrosive fluids, and in no case in processes for the synthesis of urea, in particular in environments in the presence of carbamate.

According to this technique, the anticorrosive deposit which forms layer C can be effected by means of molten powders or by the application of metallic wires previously melted and consequently sprayed in atomic form onto a metallic surface. Before application it is preferable to prepare the basic surface either by blasting or any other equivalent surface cleaning technique.

In the particular case described herein, a zirconium deposit thickness is applied on the stainless steel layer of 25/22/2 CrNiMo, ranging from 0.1-10 mm or even more, preferably from 0.5 to 3 mm, depending on the geometry and function of the different zones of the lower cavity of the stripper and the possible subsequent mechanical processing phase of the part in question.

In some cases, these deposits are integrated in their surface layer by various types of "paints", in order to allow the sealing of the inevitable porosities produced by the sprayed or deposited material. The use of sealing paints depends on the nature and type of application process, according to evaluation parameters known to experts in the field.

A further object of the present invention relates to a method for protecting and restoring the surfaces of the tube bundle apparatus in use, subject to strong corrosive attacks, which is simple, economic and reproducible not only in the workshops but also for equipment operating for ordinary maintenance interventions.

The improved anticorrosive lining according to the present invention is also suitable for effecting the functional restoration of pre-existing apparatuses whose original lining needs to be substituted or repaired due to the presence of significant areas of corrosion which jeopardize its functioning and safety. In particular, it is possible to completely restore the original functioning of the apparatus and guarantee, as a result of the enhanced performance of the new lining, a greater operating duration and safety than those of the original ones.

According to a particular aspect of the present invention, the manufacturing method of the above apparatus can therefore also consist in the modification, repairing or revamping of pre-existing equipment. In this case the areas of a tube bundle pressure apparatus effectively or potentially exposed to corrosion, and optionally the whole cavity or part of the apparatus exposed to the risk of corrosion, is entirely lined with the necessary metallic layers until a three-layered structure as described above, is obtained. As an example, which however is non-limiting, in the case of a stripper for the synthesis of urea with a bimetallic tube bundle and lower and upper chambers bordered by a wall and a plate both consisting of a carbon steel pressure-resistant body and a layer of "urea grade" stainless steel, the reparation method according to the present invention can simply consist in cleaning the whole surface of the lower cavity (by means of the known blasting, reaming techniques, etc.) and the subsequent affixing on the stainless steel layer, of a zirconium layer having the desired thickness, for example from 0.5 to 3 mm, suitably seal welded with the lining of each bimetallic tube.

Other embodiments of the present invention, different from those specifically described above, are however possible and represent obvious variations which are in any case included in the scope of the following claims.

The invention claimed is:

1. A tube bundle apparatus configured to efficiently effect thermal exchange, under high pressure and temperature conditions, between at least two fluids of which one has highly aggressive characteristics under process conditions, comprising:

a hollow body equipped with an external casing, or pressure-resistant body, configured to tolerate operating pressures and including a material subject to corrosion by contact with the highly aggressive fluid, and including openings for entrance and exit of the fluids, wherein inside of the hollow body there are at least two cavities separated from each other by a third sealed cavity with respect to the at least two cavities, situated between two septa or plates hinged onto the pressure-resistant body, the two cavities communicating with each other by a series of tubes, whose internal wall is put in contact with the highly aggressive fluid and includes a material selected from titanium, zirconium, or an alloy of one of these, that is highly resistant to corrosion, forming a tube bundle situated between the two septa or plates that passes through the third cavity, wherein at least one of the two cavities is in contact with the highly aggressive fluid and is at least partly delimited by a three-layered wall comprising at least three metallic layers including:

an external layer configured to tolerate a predetermined pressure load, subject to corrosion by contact with the highly aggressive process fluid;

an intermediate layer made of stainless steel; and an anticorrosive lining in contact with the highly corrosive fluid, including a material selected from titanium, zirconium, or an alloy of one of these, wherein the three layered wall comprising the at least three metallic layers constitutes at least the tube-sheet plate delimiting the cavity in contact with the highly corrosive fluid, and wherein, either each tube in said bundle is a bimetallic tube comprising a stainless steel outer layer and an internal lining layer, in contact with the corrosive fluid, including a material selected from titanium, zirconium or an alloy of one of them, and said intermediate layer is strength and seal welded with the stainless steel layer of said bimetallic tubes, and said anticorrosive lining is seal welded with the internal lining of said bimetallic tubes, or each tube of said tube bundle entirely consists of a metal selected from titanium, zirconium or an alloy of one of them, and said anticorrosive lining is strength and seal welded to each of said tubes and has a thickness ranging from 2 to 10 mm.

2. The apparatus according to claim 1, wherein the material forming the anticorrosive lining is selected from titanium and zirconium.

3. The apparatus according to claim 1, positioned vertically, wherein the at least one of the two cavities bordered by the at least three metallic layers forms a lower collection chamber of the highly aggressive fluid.

4. The apparatus according to claim 1, wherein the three-layered wall completely borders the cavity in contact with the highly aggressive fluid.

5. The apparatus according to claim 1, wherein the intermediate layer has a thickness ranging from 3 to 25 mm and the anticorrosive lining has a thickness ranging from 0.5 to 10 mm.

6. The apparatus according to claim 1, wherein the intermediate layer includes a stainless steel selected from AISI 316L steel, INOX steels, special austenitic-ferritic steels.

7. The apparatus according to claim 1, wherein the anticorrosive lining is at least partially obtained by a welding deposit.

8. The apparatus according to claim 1, wherein the anticorrosive lining is obtained by thermal spray technology.

9. The apparatus according to claim 1, comprising weepholes situated in the pressure-resistant body.

10. The apparatus according to claim 1, further comprising a carbon steel layer inserted between the intermediate layer and the anticorrosive lining, the carbon steel layer having a thickness ranging from 2 to 10 mm.

11. A plant configured to perform synthesis of urea, the plant comprising the apparatus of claim 1.

12. The plant according to claim 11, wherein the apparatus is configured as stripper in a high pressure synthesis cycle.

13. A method for manufacturing a tube bundle apparatus according to claim 1, comprising:

constructing a hollow body equipped with an external casing, or pressure-resistant body, configured to tolerate operating pressures and including a material subject to corrosion by contact with the highly aggressive fluid;

forming, inside the hollow body, at least two cavities separated from each other by a third sealed cavity with respect to the at least two cavities, by interpositioning at least two plates, or septa, hinged to the pressure-resistant body, on which, to put the cavities in communication with each other, a series of tubes is inserted, forming a tube bundle, whose internal wall includes a material selected from titanium, zirconium, or an alloy of one of these, highly resistant to corrosion, so that during use, the internal wall of the tubes and a wall of at least one of the two cavities is in contact with the highly aggressive fluid;

wherein the wall that delimits at least one of the cavities is at least partly produced by superimposing three metallic layers in order including:

an external layer configured to tolerate a predetermined pressure load, subject to corrosion by contact with the highly aggressive process fluid;

a stainless steel intermediate layer; and an anticorrosive lining situated on the internal surface in contact, during use, with the highly corrosive fluid, including a material selected from titanium, zirconium, or an alloy of one of these.

14. The manufacturing method according to claim 13, wherein the wall of the cavity in contact with the highly aggressive fluid is entirely produced by superimposing the external layer, the intermediate layer, and the anticorrosive lining.

15. The manufacturing method according to claim 13, wherein the anticorrosive lining includes zirconium.

16. The manufacturing method according to claim 13, wherein the cavity delimited by a three-layered wall forms a lower chamber of a stripper.

17. The manufacturing method according to claim 13, wherein the anticorrosive lining is deposited in close contact with the intermediate layer by a thermal spray technique.

18. The manufacturing method according to claim 17, wherein the thermal spray technique is used in an area of the tube sheet plate.

19. The manufacturing method according to claim 17, wherein the thermal spray technique is a spray arc technique.

20. The manufacturing method according to claim 17, wherein before application of the anticorrosive lining, a surface of the intermediate layer is subjected to a cleaning.

21. The manufacturing method according to claim 13, wherein the anticorrosive lining has a thickness ranging from 0.5 to 10 mm.

22. The manufacturing method according to claim 13, wherein the wall made by the three superimposed metallic layers constitutes the plate wherein the tube bundle is inserted.

23. The manufacturing method according to claim 13, wherein the tube bundle is formed by bimetallic tubes, each comprising a stainless steel outer layer and an internal lining layer, in contact with the corrosive fluid, including a material selected from titanium, zirconium, or an alloy of one of them.

24. The manufacturing method according to claim 22, wherein the intermediate layer is strength and seal welded with the stainless steel outer layer of the bimetallic tube, and the anticorrosive lining is seal welded with the internal lining layer of the bimetallic tube.

25. The manufacturing method according to claim 13, wherein the tube bundle is formed by tubes entirely made of a metal selected from titanium, zirconium, and an alloy thereof.

26. The manufacturing method according to claim 25, wherein, in the plate, the anticorrosive lining is strength welded with each tube of the tube bundle.

27. The manufacturing method according to claim 25, further comprising a carbon steel layer placed onto the intermediate layer, and wherein the anticorrosive lining, having a thickness of from 2 to 10 mm, is explosive cladded onto the carbon steel layer.

28. A modification method of pre-existing equipment to obtain an apparatus according to claim 1, the apparatus being a tube bundle pressure apparatus comprising bimetallic tubes made of stainless steel internally lined with a metal selected from zirconium, titanium, or an alloy of the metals, wherein at least a part of a surface in contact with the process fluid is subject to strong corrosive attacks, comprising:

applying an internal lining close to and above areas effectively or potentially exposed to corrosion or on a whole cavity or part of the apparatus exposed to risk of corrosion, with necessary metallic layers obtaining a three-layered structure including:

an external layer configured to tolerate a predetermined pressure load, subject to corrosion by contact with the highly aggressive process fluid;

a stainless steel intermediate layer, strength and seal welded with the stainless steel inlet of each of the bimetallic tubes forming the tube bundle;

an anticorrosive lining situated on the internal surface in contact, during use, with the highly corrosive fluid, including a material selected from titanium, zirconium, or an alloy of one of these, seal welded with the internal lining of each of the bimetallic tubes.

29. The modification method according to claim 28, for repairing or revamping pre-existing equipment.

30. The modification method according to claim 28, effected during an ordinary maintenance intervention.

31. The modification method according to claim 28, comprising cleaning a whole surface of the cavity and subsequent affixing, on the stainless steel layer, a layer of zirconium having a thickness from 0.5 to 3 mm seal welded with the lining of each bimetallic tube.

* * * * *